United States Patent
Green

(10) Patent No.: US 6,227,226 B1
(45) Date of Patent: May 8, 2001

(54) FIRE ACTIVATED, FAIL SAFE, GATE VALVE BONNET

(75) Inventor: David K. Green, Banchory (GB)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/538,595

(22) Filed: Mar. 24, 2000

(51) Int. Cl.$^7$ .................................................. F16K 17/38
(52) U.S. Cl. ............................. 137/72; 137/70; 137/79; 166/69
(58) Field of Search ................................ 137/72, 70, 79; 169/69

(56) References Cited

U.S. PATENT DOCUMENTS

| | | | | |
|---|---|---|---|---|
| 3,958,592 | * | 5/1976 | Wells et al. | 137/315 |
| 4,421,134 | * | 12/1983 | Bruton et al. | 137/72 |
| 4,505,291 | * | 3/1985 | Bruton | 137/77 |
| 4,635,670 | * | 1/1987 | Kilmoyer | 137/79 |
| 4,947,886 | * | 8/1990 | Grove | 137/72 |

* cited by examiner

Primary Examiner—Michael Buiz
Assistant Examiner—Ramesh Krishnamurthy
(74) Attorney, Agent, or Firm—Madan, Mossman & Sriram, P.C.

(57) ABSTRACT

A well control system having well controlled fluids distributed through pipes includes valves that are opened by a heat softened valve obstruction element. The translation of a fluid flow obstructing gate in a gate valve is driven by a stem element attached to the gate. Without a mechanical or fluid obstacle, fluid pressure in the distribution pipe above about 2 psi will drive the valve gate to a biased position. This internal pressure displacement of the valve gate also displaces the gate stem. In the present invention, the displacement of gate stems for critical valves from a normal maintenance position to an emergency activation position, is obstructed by a fusible barrier that is secured across the gate stem translation path. In the event of a well fire, at a predetermined temperature of fusion, the barrier element will no longer resist the displacement force imposed by the stem. The internal pipe pressure on the stem will force penetration of the stem through the fusible barrier thereby permitting the valve to open and release fluids into the well for the purpose of plugging uncontrolled well flow and extinguishing the fire.

20 Claims, 3 Drawing Sheets

FIRE ACTIVATED, FAIL SAFE, GATE VALVE BONNET

BACKGROUND OF THE INVENTION

1. Field of the Invention

The present invention relates to industrial safety equipment. In particular, the present invention relates to the automatic operation of fluid control valves in the event of fire in the proximity of the valve body.

2. Description of the Related Art

Release of well control fluids such as water, chemical suppressants or well plugging foams, often depends upon the operation of a fluid line valve. Depending upon the specific fluid control system, certain valves must be opened or closed at a critical moment.

Many fire control systems are under the positive control of sensors that activate externally powered controllers and valve motors. Some fire risk activities, however, such as gas and oil wellheads, are not well suited for powered actuation due to remoteness of the wellhead location. Although fire control fluid systems may be and are installed at remote wellheads, the unavoidable fact remains that the critical valves must be manually operated. At odds with this fact is the dilemma of those facilities and installations whereat the critical valve or valves must be located in the proximity of where such a fire would, in greatest probability, occur. Here, the critical fire control valves may be enveloped in flame and therefore hazardous if not impossible to be manually operated when needed.

It is an object of the present invention, therefore, to provide a valve construction that operates without manual intervention in the presence of fire or excessive heat.

Another object of the present invention is provision of a fluid control valve that opens or closes, as required, in the presence of fire or excessive heat.

A further object of the present invention is a wellhead control assembly having a well fluid control system that is initiated by a heat fused valve.

SUMMARY OF THE INVENTION

These and other objects of the present invention are accomplished by a valve construction wherein the valve operating stem is biased to a "fail-safe" position by fluid pressure within the pipe served by the valve. For example, well or fire control fluid flow from a supply pipeline is blocked by a valve gate having a reversely translating control stem. Fluid pressure within the supply pipeline exerts a bias on the gate and control stem to urge the gate toward the open pipeline flow position. This line pressure bias is opposed by external fluid pressure applied to an operating cylinder upon the face of the associated stem operating piston or diaphragm. This external fluid pressure is usually applied by a manual pump. Release of the external fluid pressure allows the pipeline pressure to open (or close) the valve as required. At the closed position, the gate setting is maintained against the pipeline pressure by closing the flow port that admits the external pressure.

Adjunctive to the foregoing valve construction, opening movement of the valve gate stem is restrained by a eutectic material cap block that is thermally fusible at a predetermined, relatively low temperature such as 300° F., for example. External fluid pressure within the gate valve operating cylinder is released and the cylinder vented to allow the pipeline pressure to open the valve but for the cap block obstruction. Accordingly, pipeline pressure causes the gate stem to bear against the fusible cap block.

In the event of fire in the proximity of the valve, the fusible cap block is heated. When the desired heat of fusion is attained, the valve stem is pushed through the heat softened eutectic material by the pipeline pressure bias thereby opening the "kill fluid" supply line.

BRIEF DESCRIPTION OF THE DRAWINGS

The following detailed description of the present invention is supported by the drawings wherein like reference characters designate like or similar elements of the present invention assembly throughout the several figures of the drawings and.

DETAILED DESCRIPTION OF THE PREFERRED EMBODIMENTS

Figure 1:
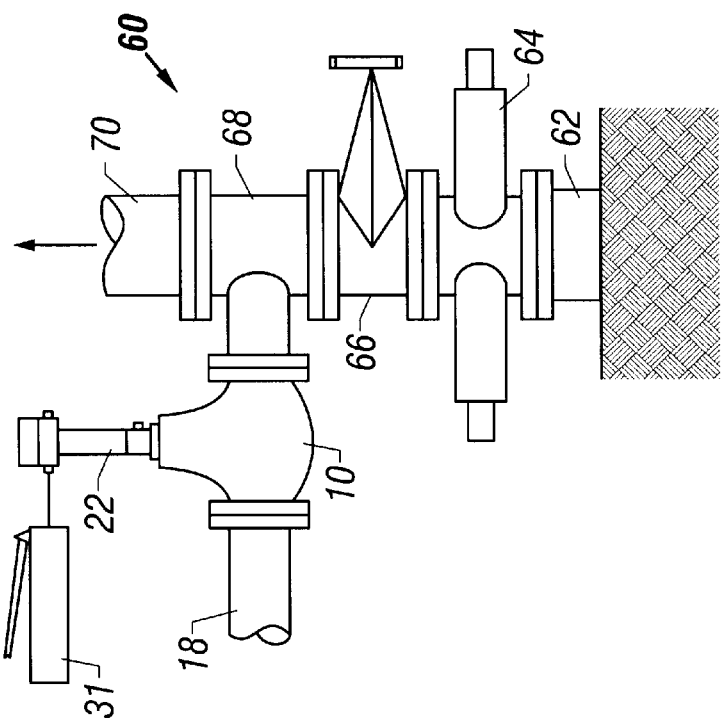
FIG. 1 is an a schematic view of a petroleum wellhead application of the present invention.

An important use environment for the present invention is represented by FIG. 1 which illustrates a highly simplified petroleum wellhead 60, natural gas or crude oil, having a downhole pressure drive. The well casing head 62 is capped by a first blow-out preventer 64. Above the blow-out preventer is a main shut-off valve 66 that is connected with a T-fitting 68. Production pipe 70 is shown above the T-fitting. More frequently, however, is a production tube adapter and additional blow-out preventers respective to each production tube. Respective to each production tube is a shut-off valve and a production control choke.

From the T-fitting spur is a well "kill" line 18 that carries well control fluids that are effective to plug the well flow pipe when released to flow into the well. The "kill" valve 10 is normally operative to obstruct the line 18 in readiness for a well control emergency such as a fire in the vicinity of the wellhead. Traditionally, a "kill" valve 10 is a gate valve in which the gate thereof is driven into a position that interrupts the valve flow channel by a hydraulic piston motor that is energized by a hand pump 31.

Figure 2:
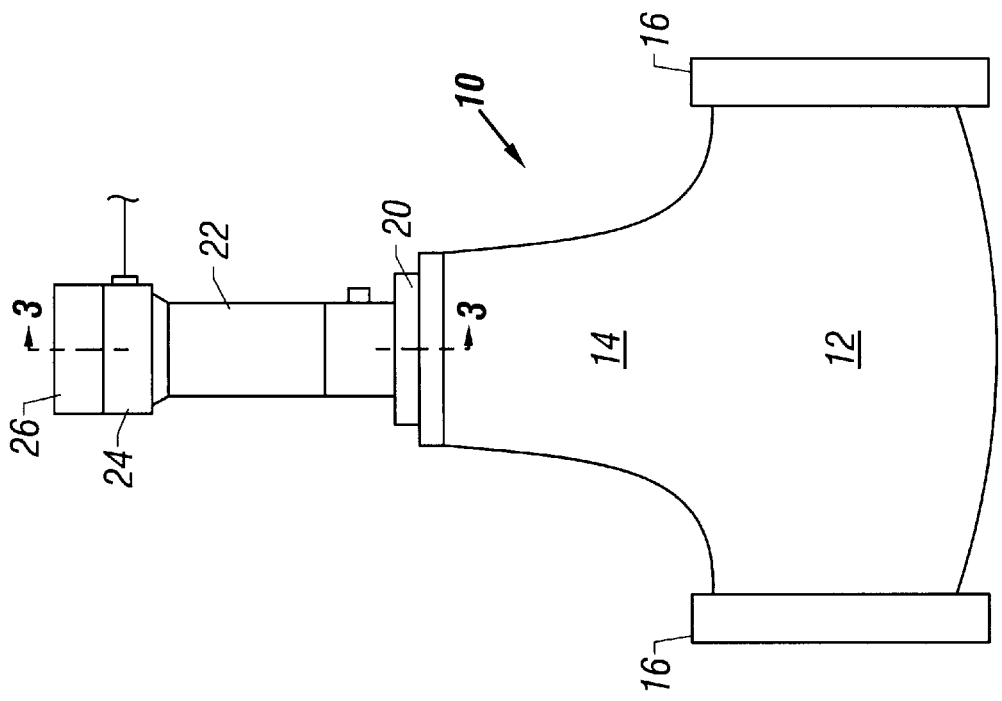
FIG. 2 is an elevation view of the present invention in finished assembly with a hydraulic pressure operated gate valve.

With respect to FIG. 2, a gate valve embodiment of the present invention 10 comprises a valve body 12 and a gate housing 14. The gate housing may be integrally cast or forged with the valve body or assembled therewith as a separately fabricated component. Fluid flow through the valve body is obstructed or regulated by a valve gate, not shown. In an operatively open position, the valve gate is extracted from the bore channel of the valve into a gate housing 14. The gate housing is capped by a bonnet 20 that also houses the gate sealing and operating apparatus.

The bonnet 20 is attached to the gate housing 14 by a base flange 40. The valve gate is a smooth faced plate or disc having a shallow wedge shape that is translated in opposite directions across the valve body channel by a stem 32. The axial length of the stem may be extended by a stem shaft 34. Stem seal packing 36 is inserted in a bonnet counterbore around the gate stem 32. Internally, the bonnet carries a seal face 42 around the stem 32 boring to mate with the stem shoulder 44. When the gate is entirely extracted from the valve bore, the faces 42 and 44 mate to seal valve stem.

An annular piston 26 is confined between the end of the gate stem 32 and a shoulder of the stem shaft 34. A cylinder body 22 is secured to the base flange 40 by a threaded and sealed assembly and surrounds the outer perimeter of the piston 26 with a cylinder bore 27. The cylinder body 22 is capped by a head member 24 having a pressurized fluid delivery port 30. The annular space 28 between the face of the piston 26 and the cylinder head constitutes a fluid pressure chamber.

Figure 3:
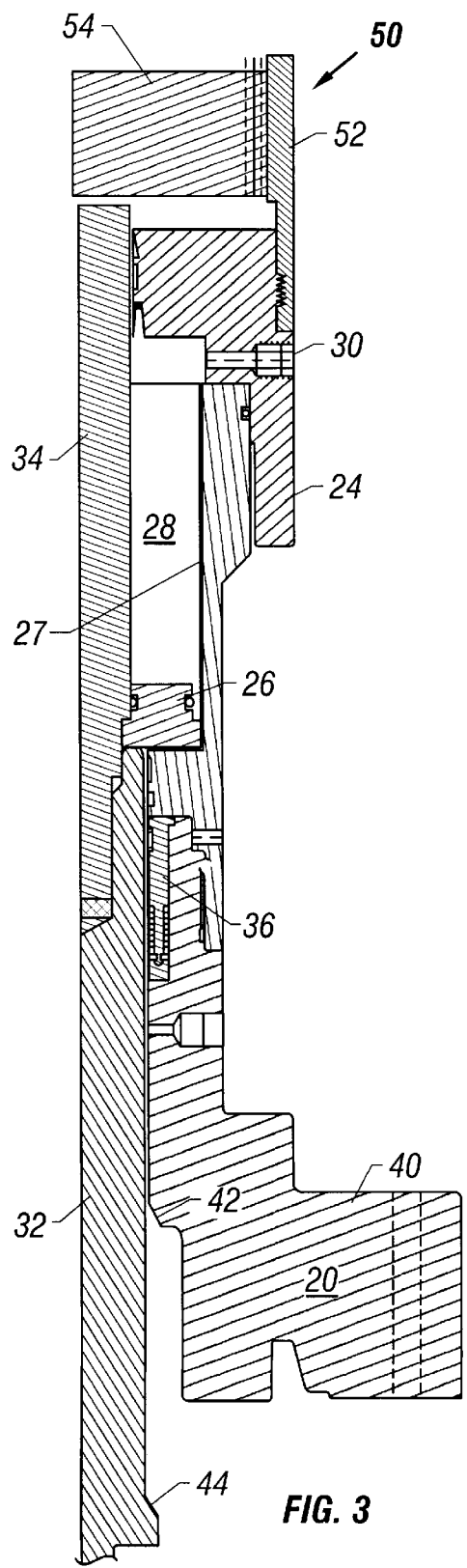
FIG. 3 is a half-section elevation of the present invention as viewed along the cutting plane 3—3 of FIG. 2; and, FIG. 4 is a half-section elevation of the present invention as viewed along the cutting plane 3—3 of FIG. 2 and the valve gate stem extended.

Assembled with the cylinder head 24 is a fusible lock-out cap 50. The lock-out cap comprises a cup ring 52 having an internal assembly thread and a fusible disc 54. The fusible disc 54 is preferably formed from eutectic material such as Delrin and is secured across the axial translation path of the stem shaft 34 after the gate is positioned at its normally operative position. Such normally operative position may be either opened or closed depending on the particular application. For purposes of the present example, the normally operative gate position is closed as is illustrated by FIG. 3. The disc 54 temperature of fusion is a user specified value which may span from about 250° F. to about 500° F., for example. Another example of suitable material for the disc 54 is unfilled acetyl homopolymer having a specific gravity of about 1.23 to about 1.34 and a hardness of about 35 to about 125. Also, an acetyl copolymer having a specific gravity of about 1.42, a Rockwell Hardness about M94, R120 and a flow rate about 6.0 g/10 min., nominal per ASTM D1238. Also suitable is an acetyl copolymer having a specific gravity about 1.42, a Rockwell Hardness of M94, R120 and a flow rate of 1.0 g/10 min., nominal per ASTM D1238.

To drive the valve gate to the closed position, fluid such as hydraulic oil is pumped through delivery port 30 into the pressure chamber 28. Traditionally, such valve actuating fluid is transferred by means of a hand pump. However, any suitable fluid pressure source such as portable pressure tank may also be used. As fluid pressure within the chamber 28 rises, the valve gate and stem is pushed by the pressure into the valve body by the piston 26. This axial displacement brings the outer end of the valve stem shaft 34 to a predetermined position with respect to the outer surface of the cylinder head 24.

Fluid motor actuated gate valves as heretofore described are often designed with a bias to eject the gate from the valve body by fluid pressure within the associated pipeline. Hence, the fluid pressure introduced to chamber 28 opposes the internal pipe pressure. Prior art maintenance of the valve gate at the normally operative position is facilitated by closure of the fluid delivery port 30 thereby encapsulating within the chamber 28 the fluid volume necessary to hold the piston 26 and stem 32 at the normally operative position.

Pursuant to the present invention, the fusible end cap 50 is threaded into place over the cylinder head 24, to obstruct subsequent ejection of the gate and stem 34 from the valve body. With the gate and fusible end cap in place, the fluid pressure source may be removed from the port 30 and the port aperture allowed to vent atmospherically. Although internal pipe pressure exerted against the sectional area of the stem 32 may cause the stem to press forcibly against the underside of the fusible plug 54, the eutectic material structure of the fusible plug is sufficient at normal temperatures to resist the stem force.

Figure 4:
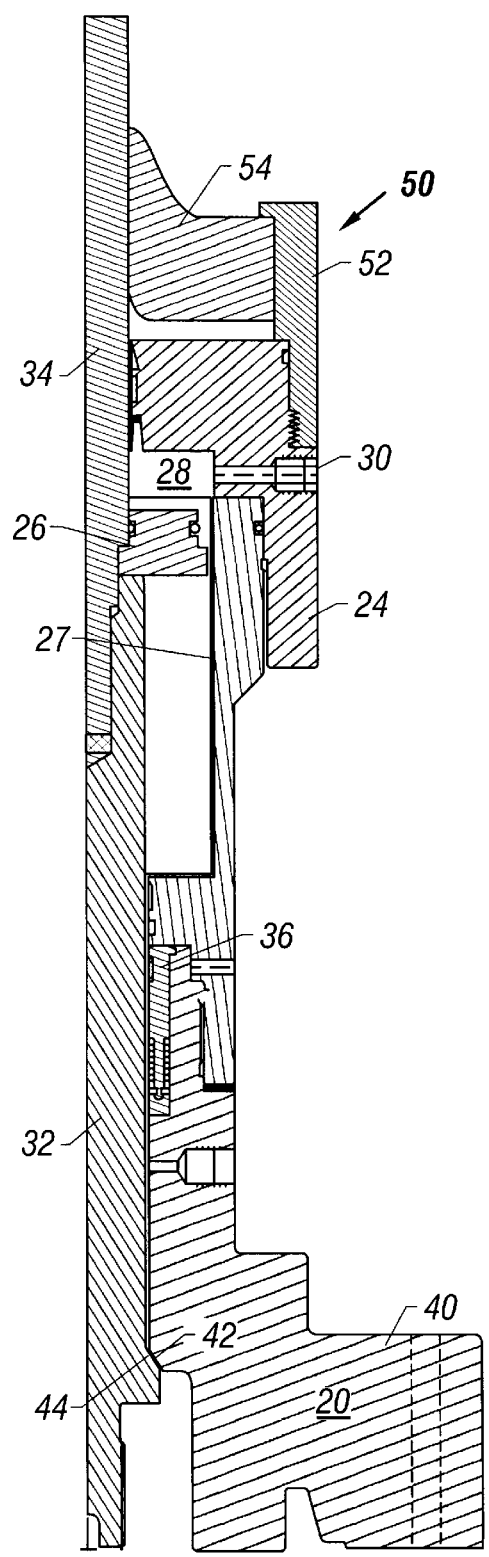

In the event of a fire or other intense heat source in the immediate proximity of the valve 10 so as to raise the temperature of the immediate environment of the fusible plug above about 250° F., the fusible plug 54 will lose structural strength and yield to the standing force exerted by the stem 32. Resultantly, the stem shaft 34 is pushed through the fusible plug 54 thereby opening the valve 10 as shown by FIG. 4.

Figure 5:
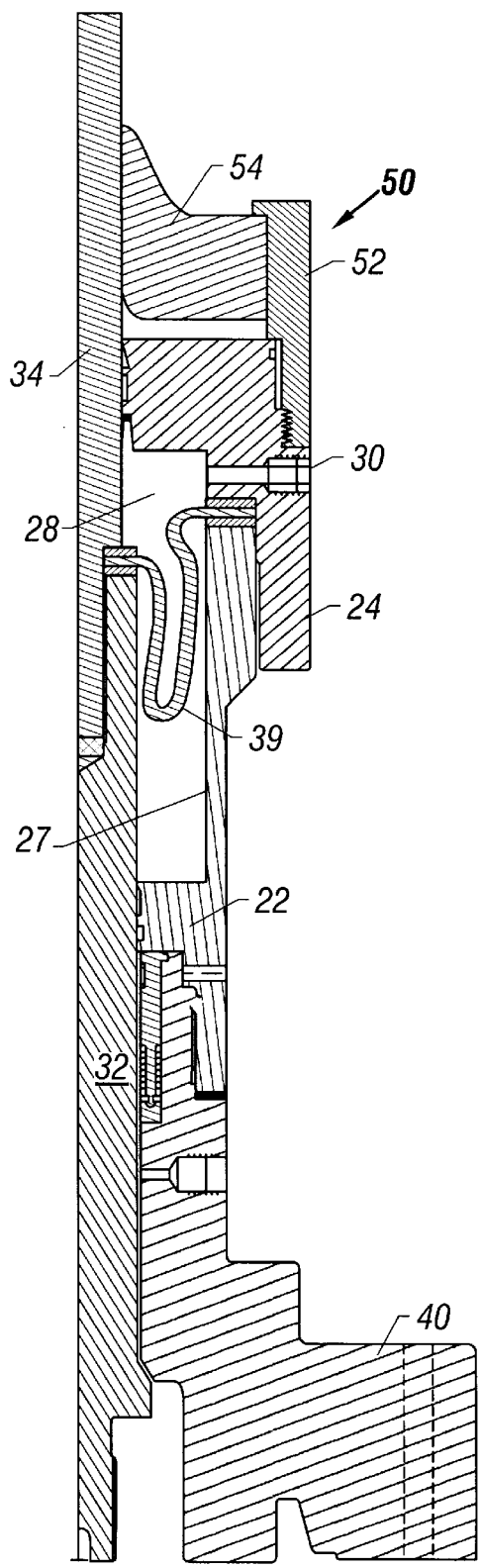
FIG. 5. is a half-section elevation of an alternative embodiment of the invention.

As a preferred embodiment, the present invention has been described with respect to a gate valve that is operated by piston-cylinder fluid motor. Those of ordinary skill in the art will understand the principles of the present invention may be readily applied to diaphragm operated valves wherein a flexible diaphragm across a sealed chamber may have a gate stem secured thereto. Such an alternative embodiment is illustrated by FIG. 5 which shows a diaphragm disc 39 having an inside aperture perimeter clamped between the stem shaft 34 and gate stem 32. The outer perimeter of the diaphragm disc 39 is claimed between the upper end of the cylinder 22 and a shoulder face on the cylinder head 24. Moreover, the present invention may be utilized with valve types other than gate valves by means of suitable motion transmission linkage that translates linear to rotary motion. Additional embodiments of the present invention may be made by those of skill in the art without departing from the spirit of the present invention.

What is claimed is:

1. A fusible cap for a valve body, said cap comprising an assembly shell having a mechanism for securing the assembly shell to a valve bonnet proximate of a valve closure stem, said shell confining a disc component that is disposed across an axial displacement path of said closure stem for obstructing the operative displacement of said closure stem by direct abutment, said disc component being constructed of a material that is fusible in the proximity of a predetermined temperature to permit the operative displacement of said closure stem by penetration of said disc component.

2. A fusible cap for a valve body as described by claim 1 wherein the fusible material of said disc component is eutectic.

3. A fusible cap for a valve body as described by claim 2 wherein said fusible material is Delrin.

4. A fusible cap as described by claim 1 wherein said assembly shell is a cylindrical ring and said mechanism for assembly is a screw thread around the perimeter of said ring.

5. A fusible cap as described by claim 4 wherein said disc component for obstructing the operative displacement of said stem is a disc of eutectic material secured to said ring.

6. A valve having a fluid flow obstruction element that is operative by axial displacement of a stem within a valve bonnet, a cap secured to said bonnet, said cap having a fusible element positioned across the displacement path of said stem to obstruct the displacement thereof by direct abutment, said fusible element having a failure temperature above about 250° F. for yielding to penetration by said stem.

7. A valve as described by claim 6 wherein said fluid flow obstruction element is a gate that is secured to said stem and confined to translation movement in opposite directions parallel with an axis of said stem.

8. A valve as described by claim 7 wherein the gate translation movement is driven in one translation direction by fluid pressure within a fluid flow bore of said valve and in the other translation direction by fluid pressure applied selectively to the face of a piston secured to said stem.

9. A valve as described by claim 7 wherein the gate translation movement is driven in one translation direction by fluid pressure within a fluid flow bore of said valve and in the other translation direction by fluid pressure applied selectively to the face of a diaphragm secured to said stem.

10. A valve as described by claim 8 wherein said fusible element is secured across a translation path of said stem in abutting opposition to translation of said stem by pressure within the fluid flow bore of said valve.

11. A valve as described by claim 9 wherein said fusible element is secured across a translation path of said stem in abutting opposition to translation of said stem by pressure within the fluid flow bore of said valve.

12. A gate valve having a bonnet for confining a fluid flow obstructive gate that is operatively translated by a stem, a fusible cap secured to said bonnet and positioned to interfere with axial translation of said stem from a set position by direct abutment, said fusible cap having a failure temperature above about 250° F. to permit penetration of said cap by said stem for translation of said stem from said set position.

13. A gate valve as described by claim 12 wherein said stem is selectively translated to a primary position by a motor and retained at said primary position by abutment against said fusible cap.

14. A gate valve as described by claim 13 wherein said motor is a fluid motor and the material of said fusible cap is Delrin.

15. A fire control system having fire control fluid distributed through pipes having a valve therein, said valve being operative to release fire control fluid by fluid pressure driven translation of a valve stem for flow through said pipes, said stem being restrained from translation by direct abutment with a fusible stem block whereby thermally induced softening of said fusible stem block permits direct penetration thereof by said stem.

16. A fire control system as described by claim 15 wherein said valve is a gate valve having a normal flow control position, said fusible block being disposed across a stem translation path.

17. A fire control system as described by claim 16 wherein said fusible block is a eutectic material.

18. A valve for use in a hydrocarbon producing wellhead to control flow of a fire extinguishing fluid to said wellhead, said valve having a flow control gate positioned by a stem that is translated by fluid pressure to open and close said valve, said gate having a normal position that is maintained against a force bias from fire extinguishing fluid pressure by a fusible obstruction to the translation of said stem that is indirect abutment with said obstruction, penetration of said fusible obstruction by said stem being required to translate said gate from said normal position.

19. The valve as described by claim 18 wherein said fusible obstruction is a valve bonnet cap having a fusible disc disposed across a translation path of said stem.

20. The valve as described by claim 18 wherein said stem is pushed by fluid pressure to a maintenance position and retained at said maintenance position by a fusible disc disposed across a translation path of said stem.

\* \* \* \* \*